United States Patent [19]

Somemiya et al.

[11] Patent Number: 4,742,130
[45] Date of Patent: May 3, 1988

[54] POLYETHYLENE TEREPHTHALATE RESIN COMPOSITION

[75] Inventors: Akiyoshi Somemiya, Kobe; Kazushi Hirobe, Osaka, both of Japan

[73] Assignee: Kanegafuchi Kagaku Kogyo Kabushiki Kaisha, Osaka, Japan

[21] Appl. No.: 58,053

[22] Filed: Jun. 4, 1987

[30] Foreign Application Priority Data

Jun. 5, 1986 [JP] Japan .................. 61-130578

[51] Int. Cl.$^4$ .............................. C08L 67/02
[52] U.S. Cl. .................. 525/444; 525/533; 525/534; 528/110
[58] Field of Search .............. 525/444, 533, 534; 528/110

[56] References Cited

U.S. PATENT DOCUMENTS 3,381,057  4/1968  Senoo et al. .................. 260/860
4,322,335  3/1982  Nield .................. 523/522

Primary Examiner—Patricia A. Short
Attorney, Agent, or Firm—Armstrong, Nikaido, Marmelstein & Kubovcik

[57] ABSTRACT

A polyethylene terephthalate resin composition suitable for use in moldings which comprises:
(A) 5 to 93 parts of a polyethylene terephthalate resin and
(B) 95 to 7 parts of a polyethylene terephthalate block copolymer having 10 to 55% by weight of units represented by the formula (I):

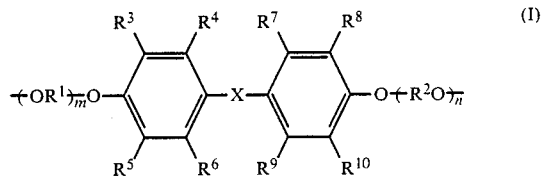

wherein $R^1$ and $R^2$ are the same or different and each is a bivalent hydrocarbon group having 2 to 4 carbon atoms, $R^3$ to $R^{10}$ are the same or different and each is hydrogen atom, a monovalent hydrocarbon group or a halogen atom, X is a bivalent group or single bond, and each of m and n is an integer of 5 to 20, said parts of said components (A) and (B) being parts by weight based on the total amount of said components (A) and (B). The composition of the invention can be molded according to injection molding as well as extrusion, and the obtained molded articles have the excellent heat resistance, surface property and fatigue resistance.

6 Claims, No Drawings

POLYETHYLENE TEREPHTHALATE RESIN COMPOSITION

BACKGROUND OF THE INVENTION

The present invention relates to a polyethylene terephthalate resin composition suitable for use in moldings.

Hitherto, a polyethylene terephthalate resins are largely used as materials for fibers, films, and the like, because of having excellent mechanical properties and electric properties. However, since there are defects of the moldability resulting from poor crystallization property and the brittleness of the molded articles, in polyethylene terephthalate, it has been said that they are inferior to polybutylene terephthalate resins which belongs to polyesters.

In order to improve the above defects, there have been hitherto proposed a method wherein an agent for nucleation, a plasticizer or an inorganic filler is introduced, a polymer blending method, and the like, and the methods achieve success in some degree. However, the improvement of the brittleness is unsatisfactory.

An object of the present invention is to provide a polyethylene terephthalate resin composition suitable for use in moldings, capable of giving moldings having excellent surface properties and fatigue strength.

This and other objects of the present invention will become apparent from the description hereinafter.

SUMMARY OF THE INVENTION

In accordance with the present invention, there is provided a polyethylene terephthalate resin composition suitable for use in moldings which comprises:

(A) 5 to 93 parts of a polyethylene terephthalate resin and
(B) 95 to 7 parts of a polyethylene terephthalate block copolymer having 10 to 55% by weight of units represented by the formula (I):

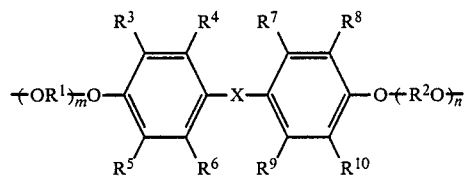

wherein $R^1$ and $R^2$ are the same or different and each is a bivalent hydrocarbon group having 2 to 4 carbon atoms, $R^3$ to $R^{10}$ are the same or different and each is hydrogen atom, a monovalent hydrocarbon group or a halogen atom, X is a bivalent group or single bond, and each of m and n is an integer of 5 to 20; said parts of said components (A) and (B) being parts by weight based on the total amount of said components (A) and (B).

DETAILED DESCRIPTION

The polyethylene terephthalate resin (A) used in the present invention is a resin containing not less that 90% by weight of polyethylene terephthalate units, that is, a resin composed of 90% by weight of polyethylene terephthalate segments and less than 10% by weight of a copolymerizable component such as isophthalic acid, naphthalenedicarboxylic acid, an aliphatic dicarboxylic acid, propylene glycol, butanediol, hexanediol, or other dicarboxylic acids or diols. The use of the above-mentioned polyethylene terephthalate resins is not particularly limited, and it is preferable to use a resin having an inherent viscosity (hereinafter referred to as "[IV]") of 0.4 to 0.8 in a mixture of phenol and tetrachloroethane (1:1 by weight) in a concentration of 0.5 g/dl at 25° C., in order to attain the object of the present invention.

The composition of the present invention contains, with the polyethylene terephthalate resin (A), the polyethylene terephthalate block copolymer (B) having 10 to 55% by weight, preferably 15 to 55% by weight, more preferably 25 to 50% by weight of units represented by the formula (I):

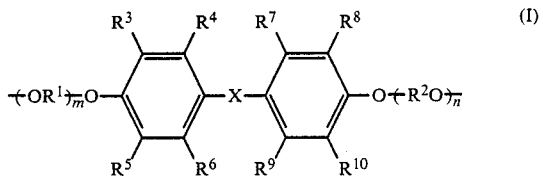

wherein $R^1$ and $R^2$ are the same or different and each is a bivalent hydrocarbon group having 2 to 4 carbon atoms, $R^3$ to $R^{10}$ are the same or different and each is hydrogen atom, a monovalent hydrocarbon group or a halogen atom, X is a bivalent group or single bond, and each of m and n is an integer of 5 to 20.

The block copolymer (B) is used for solving the various disadvantages of polyethylene terephthalate resin. The block copolymer (B) can be obtained by adding an addition product of a bisphenol with an alkylene oxide, having the formula (I) to bis-hydroxyethyltetraphthalate (hereinafter referred to as "BHET") being a precursor of polyethylene terephthalate or polyethylene terephthalate oligomer in a predetermined amount, and subjecting the mixture to the condensation polymerization in a usual manner.

When the addition product of the bisphenol with the alkylene oxide, having the formula (I) is block copolymerized with the precursor or the oligomer of polyethylene terephthalate, a small amount of glycols other than ethylene glycol or dicarboxylic acids other than terephthalic acid may be copolymerized with the above components.

The polyethylene terephthalate block copolymer (B) having [IV] of 0.5 to 1.4 can be preferably used, more preferably from 0.6 to 1.2, and especially from 0.7 to 1.0. When [IV] is less than 0.5, there are problems in flexibility, and on the other hand, when [IV] is more than 1.4, the effect for accelerating crystallization becomes poor.

When, instead of the block copolymer (B) having the units (I), a polymer having a component of known polyether such as polyethylene glycol, polypropylene glycol or polytetramethylene glycol is used, the effect of the invention cannot be obtained. That is, when using the polymer having the known polyether component instead of the block copolymer (B), various problems occur, for example, the copolymer and the molded article are unusually colored, the appearance of the article becomes bad, the impact strength, the fatigue strength and abrasion resistance are lowered, scraps of the article cannot be reused, the moisture resistance and electric property are lowered, molds are contaminated, and the like.

When the content of the units (I) in the polyethylene terephthalate block copolymer (B) is less than 10% by weight, the effect for accelerating the crystallization is poor, and when the content is more than 55% by weight, the various above-mentioned properties of the polyethylene terephthalate resin composition does not appear efficiently.

In the formula (I), $R^1$ and $R^2$ are the same or different and each of $R^1$ and $R^2$ is a bivalent hydrocarbon group having 2 to 4 carbon atoms such as ethylene group, propylene group or tetramethylene group. Examples of X are, for instance, a bivalent hydrocarbon group such as a group having the formula:

(wherein Y is hydrogen atom or a substituted or non-substituted alkyl group having 1 to 5 carbon atoms), a bivalent group such as —S—, —O—, —SO$_2$—, —CO—, —NY— (wherein Y is defined as above), the single bond, and the like. Among them, the group having the formula:

(wherein Y is defined as above), —O— and —SO$_2$— are preferred from the point of the moldability, more preferably isopropylidene group. $R^3$ to $R^{10}$ are the same or different, and each of $R^3$ to $R^{10}$ is hydrogen atom, a monovalent hydrocarbon group having 1 to 18, preferably 1 to 5 carbon atoms, e.g. an alkyl group having 1 to 18, preferably 1 to 5 carbon atoms, such as methyl or ethyl group, and a halogen atom such as chlorine or bromine.

In the formula (I), the degree of polymerization of alkylene oxide $R^1O$ and $R^2O$, that is, each of m and n is an integer of 5 to 20, preferably from 5 to 10. When each of m and n is less than 5, the crystallization property, impact resistance, and surface property become unsatisfactory, and when each of m and n is more than 20, the thermal stability and the moisture resistance are lowered, and therefore the effect of the invention can be obtained within only a narrow scope.

The composition of the present invention is composed of 5 to 93 parts by weight, preferably 10 to 85 parts by weight of the polyethylene terephthalate resin (A) and 95 to 7 parts by weight, preferably 90 to 15 parts by weight of the polyethylene terephthalate block copolymer (B), the total amount of the components (A) and (B) being 100 parts by weight. When the amount of the polyethylene terephthalate resin (A) is less than 5 parts by weight, only the effect obtained in case of using the polyethylene terephthalate block copolymer (B) alone can be obtained, and when the amount is over 93 parts by weight, the crystallization property are lowered.

The preparation of the composition of the present invention is not particularly limited and any known methods are applicable. It is preferable to use a biaxial extruder in order to stably obtain the desired properties. Concretely, the composition is prepared by blending the polyethylene terephthalate (A) with the polyethylene telephthalate bisphenol alkylene oxide block copolymer (B). The thus obtained composition of the present invention shows a viscoelastic spectrum different from that of a polyethylene terephthalate copolymer containing the addition product as a copolymerizable component in an equal amount to the proportion of the addition product in the composition. That is, the composition of the invention is higher in peak temperature determined by tan δ and larger in peak width than the above-mentioned polyethylene terephthalate copolymer. Although it is considered that the ester interchange slightly occurs in the extruder while blending, the properties of the composition of the invention is different from the properties of the above copolymer. The characteristics of the invention are produced due to the above different properties.

The polyethylene terephthalate.bisphenolpolyalkylene oxide block copolymer has an excellent compatibility with the polyethylene terephthalate, and functions as a polymeric plasticizer. Therefore, the same effect as obtained in a case of introducing a plasticizer having a low molecular weight into the polyethylene terephthalate can be obtained. Further, the bleed of plasticizer never occurs since the polyethylene terephthalate block copolymer (B) is the polymer. This characteristic is obtained only a little in case of using a polybutylene terephthalate polyether ester elastmer. Moreover, when the plasticizer having a low molecular weight is used, the used amount is limited because of the bleed. To the contralay, the polyethylene terephthalate block copolymer (B) can be mixed in any ratios to give the desired effects. It is considered that this effect as the plasticizer is one of causes of giving excellent crystallization property and surface property to the composition of the present invention.

Furthermore, the composition of the present invention is improved in the toughness by employing the block copolymer (B) which is the novel polyether ester elastmer. The block copolymer (B) can improve the toughness of polyethylene terephthalates suitable for use in fibers.

The composition of the present invention alone is applicable to injection molding or extrusion because the composition itself has the excellent moldability.

By adding an inorganic fillar such as tarc, mica or a glass fiber, particularly, the strength and modulus of elasticity can be improved. Particularly, when a composition containing 5 to 60% by weight of a glass fiber and the composition of the invention is subjected to molding in a mold at low temperature, the crystallization is excellent and therefore the heat resistance of the molded article is improved remarkably. Further, in order to accelerate crystallization, an alkali metal salt or an alkaline earth metal salt of organic acid, a vinyl polymer having a carboxylic acid salt at the side chain, and a known agent for nucleation can be added to the composition of the invention. Also, the use of known additives such as a flame retardant, a pigment, an antioxidant, an agent for preventing deterioration by light, an antistatic agent, and lubricant is not particularly limited.

In accordance with the present invention, the serious disadvantages in polyethylene terephthalate resins which is relatively inexpensive can be improved, and the polyethylene terephthalate resins can be used as the important material, which is invaluable.

The present invention is more specifically described and explained by means of the following Examples and Comparative Examples in which all percents and parts are by weight unless otherwise noted. It is to be understood that the present invention is not limited to the Examples, and various changes and modifications may be made in the invention without departing from the spirit and scope thereof.

EXAMPLE 1

There were melted and mixed 20 parts of a polyethylene terephthalate block copolymer having [IV] of 0.80, prepared by using 30% of an addition product of bisphenol A with ethylene oxide, the addition product having a number average molecular weight of 1000, and 80 parts of a polyethylene terephthalate for fibers (commercially available under the trade name "Kurapet" made by Kuraray Co., Ltd.) having [IV] of 0.62 in a biaxial extruder (a type of some direction in rotation) to give pellets. A melting temperature and a crystallization temperature of the composition were measured according to differential scanning calorimetry. The composition had the melting temperature of 264° C. and the crystallization temperature of 120° C. On the other hand, the polyethylene terephthalate being the starting material had the melting temperature of 265° C. and the crystallization temperature of 135° C. That is, the crystallization temperature of the composition was remarkably improved in spite of little lowering the melting temperature.

The melting temperature is a criterion for the heat resistance and the crystallization temperature is a criterion for the processability in a mold.

The obtained pellets were subjected to injection molding by using molds having various temperatures to give molded articles. With respect to the articles, the heat resistance, tensile strength, surface property and Izod impact strength with notch were measured.

Only when the polyethylene terephthalate pellets were molded by using a mold having a temperature of not less than 145° C., the obtained article had excellent surface, but the article prepared from the pellets of the composition of the invention had the excellent surface property, and high tensile strength and Izod impact strength with notch, even if molding at 125° C. The Izod impact strength with notch of the composition was 6.2 kg·cm/cm and that of the polyethylene terephthalate was 2.0 kg·cm/cm.

COMPARATIVE EXAMPLE 1

As to a polyethylene terephthalate copolymer containing the addition product of bisphenol A with ethylene oxide as a copolymerizable component in an equal amount to the proportion of the addition product in the composition obtained in Example 1, the melting temperature and the crystallization temperature were measured in the same manner as in Example 1. The copolymer had the melting temperature of 260° C. and the crystallization temperature of 119° C.

As to a molded article prepared from the pellets of the copolymer in the same manner as in Example 1, the surface property, tensile strength and Izod impact strength were measured. The obtained article had the excellent surface even if molding at 125° C., and had the similar values as in Example 1 in the heat resistance and surface property. However, the article was inferior to one obtained in Example 1 in the tensile strength and Izod impact strength with notch.

EXAMPLE 2 AND COMPARATIVE EXAMPLE 2

The procedure of Example 1 was repeated except that 15 parts of a polyethylene terephthalate block copolymer having [IV] of 0.95, prepared by using 40% of an addition product of bisphenol A with ethylene oxide, the addition product having a number average molecular weight of 700, and 85 parts of a polyethylene terephthalate for fibers (commercially available under the trade name "Terylene" made by Imperial Chemical Industries Ltd.) having [IV] of 0.58 were used to give pellets. The composition of the pellets had the melting temperature of 265° C. and the crystallization temperature of 128° C.

The obtained pellets were subject to injection molding at 110° C. to give a molded article. The heat distortion temperature (hereinafter referred to as "HDT") of the obtained article was 105° C. under a load of 4.7 kg.

A molded article prepared from the polyethylene terephthalate alone had HDT of 82° C.

EXAMPLE 3 AND COMPARATIVE EXAMPLE 3

The procedure of Example 1 was repeated except that 30 parts of the block copolymer used in Example 2 and 70 parts of the commercially available polyethylene terephthalate for fibers used in Example 2 were used to give pellets. The composition had the melting temperature of 263° C. and the crystallization temperature of 115° C.

The pellets were subject to injection molding at 125° C. to give a molded article. The article had the Izod impact strength with notch of 5.5 kg·cm/cm.

A molded article prepared from the polyethylene terephthalate for fibers alone had the Izod impact strength with notch of 1.8 kg·cm/cm.

EXAMPLE 4 AND COMPARATIVE EXAMPLE 4

The procedure of Example 1 was repeated except that 25 parts of a polyethylene terephthalate block copolymer having [IV] of 0.85, prepared by using 30% of an addition product of bisphenol S with ethylene oxide, the addition product having a number average molecular weight of 800, and 75 parts of a polyethylene terephthalate (Kurapet) having [IV] of 0.56 were used to give pellets. The pellets were molded, the obtained molded article was pulverized, and a regenerated molded article was obtained from the pulverized article.

On the other hand, pellets were produced in the same manner as above except that 25 parts of a polyethylene terephthalate block copolymer having [IV] of 0.65, prepared by using 30% of polyethylene glycol having a number average molecular weight of 1000 is used instead of the polyethylene terephthalate block copolymer. A regenerated article was prepared in the same manner as above.

The regenerated article prepared from the pellets prepared by using polyethylene glycol were colored brown, and the flow rate was remarkably increased (that is, the copolymer was decomposed) and the Izod impact strength with notch was decreased remarkably.

On the other hand, in the regenerated article of the pellets of the composition of the invention, the coloration little occured and the flow rate and the Izod impact strength with notch were little changed.

EXAMPLE 5 AND COMPARATIVE EXAMPLE 5

The procedure of Example 1 was repeated except that 50 parts of the polyethylene terephthalate block copolymer used in Example 1 and 50 parts of a polyethylene terephthalate for fibers (commercially available under the trade name "Tetoron" made by Toray Industries, Inc.) having [IV] of 0.66 were used to give pellets.

On the other hand, pellets were produced in the same manner as above except that 50 parts of a block copolymer having [IV] of 0.70, prepared by using 30% of polyethylene glycol having a number average molecular weight of 1500 was used instead of the above copolymer.

By using the obtained pellets of two kinds separately, the molding were done a hundred times at 285° C. in a temperature of the resin and the contamination of the mold was observed before and after molding. In case of the composition of the present invention, the specular surface was kept even after molding. However, in case of the composition prepared by using the polyethylene glycol, inner surfaces of the mold were blurred and the contamination in the state of tar was observed.

EXAMPLE 6

The procedure of Example 2 was repeated except that 30% of an addition product of 4,4′-methylene bisphenol with ethylene oxide, the product having a number average molecular weight of 1500, was used to give pellets. The composition of obtained pellets had the melting temperature of 263° C. and the crystallization temperature of 120° C.

EXAMPLES 7 TO 9 AND COMPARATIVE EXAMPLES 6 AND 7

The procedure of Example 1 was repeated except that a polyethylene terephthalate block copolymer having [IV] of 0.77, prepared by using 26% of an addition product of bisphenol A with ethylene oxide, the product having a number average molecular weight of 1000 in an amount shown in Table 1, and the polyethylene terephthalate for fibers used in Example 2 in an amount shown in Table 1 to give pellets. The pellets were subjected to injection molding to obtain molded articles.

As to the articles, the test of the flexural fatigue by plane bending was conducted according to Japanese Industrial Standards (JIS) K 7119 and the abrasion resistance test was conducted according to JIS K 7204. The results are shown in Table 1.

Molded articles were prepared in the same manner as above except that a polyethylene glycol having a molecular weight of 600 (Comparative Example 6) and a polyethylene glycol having a molecular weight of 1000 (Comparative Example 7) were respectively used instead of the addition product of bisphenol A with ethylene oxide in amounts shown in Table 1. As to the obtained articles, the properties were measured in the same manner as above. The results are shown in Table 1.

From the results in Table 1, it is understood that the composition capable of giving molded articles having excellent surface property and the fatigue resistance can be obtained only when the addition product of bispenols with alkylene oxide is used. Accordingly, the composition of the invention can provide the molding articles having the excellent heat resistance, surface property and fatigue resistance. Further, since the composition of the invention has the excellent moldability, it is suitably applied to injection molding, extrusion, and the like.

TABLE 1

| Ex. No. | Amount of block copolymer (part) | Amount of polyethylene terephthalate (part) | Flexural fatigue*1 (time) | Abrasion weight*2 loss (%) |
|---|---|---|---|---|
| Ex. 7 | 10 | 90 | 200,000 | 0.71 |
| Ex. 8 | 20 | 80 | 190,000 | 0.76 |
| Ex. 9 | 40 | 60 | 170,000 | 0.99 |
| Com. Ex. 6 | 30 | 70 | 80,000 | 1.72 |
| Com. Ex. 7 | 30 | 70 | 70,000 | 1.91 |

(Notes):
*1 A number of cycles of a stress to the time when stiffness ratio comes down to 50%, applying a test bar having a thickness of 6 mm with a repeated stress.
*2 Percentage of the decreased weight after a test piece is abraded 3000 times with a load of 250 g to the original weight, according to JIS K 7204.

What we claim is:
1. A polyethylene terephthalate resin composition suitable for use in moldings which comprises:
   (A) 5 to 93 parts of a polyethylene terephthalate resin and
   (B) 95 to 7 parts of a polyethylene terephthalate block copolymer having 10 to 55% by weight of units represented by the formula (I):

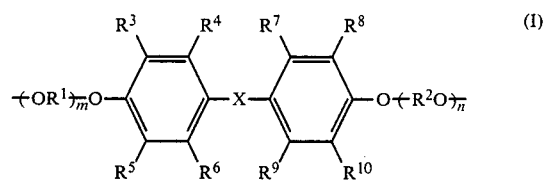

wherein $R^1$ and $R^2$ are the same or different and each is a bivalent hydrocarbon group having 2 to 4 carbon atoms, $R^3$ to $R^{10}$ are the same or different and each is hydrogen atom, a monovalent hydrocarbon group or a halogen atom, X is a bivalent group or single bond, and each of m and n is an integer of 5 to 20, said parts of said components (A) and (B) being parts by weight based on the total amount of said components (A) and (B).

2. The composition of claim 1, wherein the amount of said component (A) is from 10 to 85 parts by weight and the amount of said component (B) is from 90 to 15 parts by weight.

3. The composition of claim 1, wherein the amount of said component (A) is from 50 to 85 parts by weight and the amount of said component (B) is from 50 to 15 parts by weight.

4. The composition of claim 1, wherein said component (A) has an inherent viscosity of 0.4 to 0.8.

5. The composition of claim 1, wherein said component (B) has an inherent viscosity of 0.7 to 1.0.

6. The composition of claim 1, wherein said component (B) has 25 to 50% by weight of said unit represented by the formula (I) wherein said $R^1$ and $R^2$ are ethylene groups, said X is a group selected from the group consisting of isopropylidene group, —SO$_2$—, and —CH$_2$—, and each of m and n is from 5 to 10.

* * * * *